(12) United States Patent
Bailey

(10) Patent No.: US 9,990,003 B2
(45) Date of Patent: Jun. 5, 2018

(54) MOTION EFFECT REDUCTION FOR DISPLAYS AND TOUCH INPUT

(75) Inventor: Richard St. Clair Bailey, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 13/152,265

(22) Filed: Jun. 3, 2011

(65) Prior Publication Data

US 2012/0306768 A1 Dec. 6, 2012

(51) Int. Cl.
| | |
|---|---|
| *G06F 1/16* | (2006.01) |
| *G09G 5/00* | (2006.01) |
| *G06F 3/0488* | (2013.01) |
| *G06F 3/041* | (2006.01) |
| *G09G 5/26* | (2006.01) |

(52) U.S. Cl.
CPC .......... *G06F 1/1643* (2013.01); *G06F 1/1694* (2013.01); *G06F 3/0418* (2013.01); *G06F 3/0488* (2013.01); *G09G 5/00* (2013.01); *G09G 5/26* (2013.01); *G09G 2340/0464* (2013.01); *G09G 2340/14* (2013.01)

(58) Field of Classification Search
USPC ......................................... 345/173, 156–158
See application file for complete search history.

(56) References Cited

U.S. PATENT DOCUMENTS

| | | | | |
|---|---|---|---|---|
| 7,401,300 B2 * | 7/2008 | Nurmi | ........................... | 715/866 |
| 7,692,629 B2 | 4/2010 | Baudisch et al. | | |
| 2006/0279542 A1 * | 12/2006 | Flack et al. | ................... | 345/158 |
| 2009/0044246 A1 | 2/2009 | Sheehan et al. | | |
| 2009/0201246 A1 * | 8/2009 | Lee et al. | ....................... | 345/156 |
| 2010/0214216 A1 | 8/2010 | Nasiri et al. | | |
| 2010/0220064 A1 | 9/2010 | Griffin et al. | | |
| 2010/0231539 A1 | 9/2010 | Cruz-Hernandez et al. | | |
| 2010/0302212 A1 * | 12/2010 | Weber | ................... | G06F 3/0488 345/178 |

(Continued)

OTHER PUBLICATIONS

"Detect Movement (Accelerometer)", Retrieved at <<http://create.msdn.com/en-US/education/quickstarts/Detect_Movement_%28Accelerometer%29>>, Retrieved date : Feb. 28, 2011, pp. 7.

(Continued)

*Primary Examiner* — Robin Mishler
(74) *Attorney, Agent, or Firm* — Workman Nydegger

(57) ABSTRACT

A movement compensation system is described herein that compensates a user interface and received touch input based on detected external motion affecting a mobile computing device. The system uses the integration of accelerometer data to either offset screen rendering or adjust screen size to improve readability. The system may also improve touch target selection by offsetting received touch coordinates to compensate for device shifting. Offsets can be applied to either the screen rendering offset or can be applied to the touch coordinate input. The system may increase font size or the size of other user interface elements in response to detecting external motion. The system may also receive tuning parameters to account for device mass, dampening filters on accelerometer integrations, latency effects, and user responsiveness to motion effects. Thus, the system allows users to continue to use devices under high motion environmental conditions.

20 Claims, 4 Drawing Sheets

(56) References Cited

U.S. PATENT DOCUMENTS

2011/0012926 A1    1/2011   Kerr et al.

OTHER PUBLICATIONS

Rahmati, et al., "NoShake: Content Stabilization for Shaking Screens of Mobile Devices", Retrieved at <<http://ahmad.rahmati.com/papers/09.PerCom.NoShake.pdf>>, Seventh Annual IEEE International Conference on Pervasive Computing and Communications, PerCom, Mar. 9-13, 2009, pp. 1-6.

"Flash Player features", Retrieved at <<http://www.adobe.com/products/flashplayer/features/>>, Retrieved date : Feb. 28, 2011, pp. 20.

"Using the Accelerometer on Windows Phone 7", Retrieved at <<http://windowsteamblog.com/windows_phone/b/wpdev/archive/2010/09/08/using-the-accelerometer-on-windows-phone-7.aspx, Sep. 8, 2010, pp. 11.

* cited by examiner

MOTION EFFECT REDUCTION FOR DISPLAYS AND TOUCH INPUT

BACKGROUND

Mobile computing devices are rapidly becoming ubiquitous in people's lives. Much of the developed world now has access to mobile phones, global positioning system (GPS) receivers, tablet computers, and other mobile computing devices. Many of these devices include touch screens or stylus input so that the user interacts with the same surface on which the user receives visual information. Mobile devices already have nearly the same power that only high-end desktop computers contained a few years ago. Mobile computing devices often include powerful processors (some multi-core) and dedicated graphical processing units (GPUs). Mobile computing devices also generally include touch screens that use capacitive or other electrical field technologies to determine the position of one or more user inputs (such as the user's fingers).

Mobile computing devices are used in a variety of environments and under a variety of different conditions. A person may use a mobile computing device while riding in a car or on a bus, while at work, or anywhere else the person may go. Many mobile computing devices come in ruggedized versions for industrial use where droppage, heavy vibration, moisture, or other harsh environmental conditions may surround the device. GPS receivers and smartphones are often used in cars or during other forms of motion.

Handled and portable devices are often used during times when vibration can reduce readability of text and can complicate accurate touch selection of a given point on the screen. For example, if a person is using a mobile phone in a car on a rough road, the device may shift around in the user's hand, and the user's arm may move based on the external motion of the vehicle. Construction or other workers may use mobile computing devices under consistent vibration or other motion.

SUMMARY

A movement compensation system is described herein that compensates a user interface and received touch input based on detected external motion affecting a mobile computing device. The system uses the integration of accelerometer data to either offset screen rendering or adjust screen size to improve readability. The system may also improve touch target selection by offsetting received touch coordinates to compensate for device shifting (or shifting of the fingers or stylus doing the touch). Accelerometer data is integrated in real-time to track high frequency shifts in the device's position. These offsets can either be applied to the screen-rendering offset or can be applied to the touch coordinate input. The system may increase font size or the size of other user interface elements in response to detecting external motion. This may allow the user to continue to read or accurately provide input to the device even with ongoing motion. For some devices, the system can make such adjustments in pixel shaders or other GPU-provided hardware without additional burden on a main central processing unit (CPU) of the mobile device. The system may also receive tuning parameters to account for device mass, dampening filters on accelerometer integrations, latency effects, and user responsiveness to motion effects. Thus, the system allows users to continue to use devices under high motion environmental conditions and improves accuracy of the user's interaction with a device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
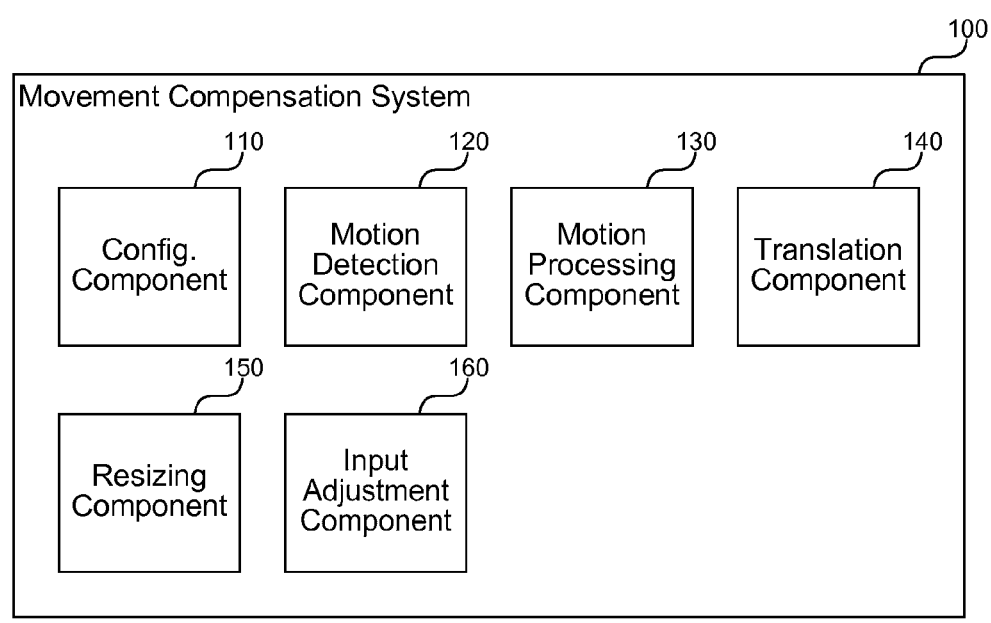
FIG. 1 is a block diagram that illustrates components of the movement compensation system, in one embodiment.

A movement compensation system is described herein that compensates a user interface and received touch input based on detected external motion affecting a mobile computing device. In some embodiments, the system uses the integration of accelerometer data to either offset screen rendering or adjust screen size to improve readability. The system may also improve touch target selection by offsetting received touch coordinates to compensate for device shifting (or shifting of the fingers or stylus doing the touch). First, accelerometer data is integrated in real-time to track high frequency shifts in the device's position. These offsets can be applied to either the screen rendering offset (creating the appearance that the screen rendering has not moved) or can be applied to the touch coordinate input (allowing a finger to touch a screen button in a position it was in just prior to the vibration shift). In some embodiments, the system may increase font size or the size of other user interface elements in response to detecting external motion. This may allow the user to continue to read or accurately provide input to the device even with ongoing motion. For some devices, the system can make such adjustments in pixel shaders or other GPU-provided hardware without additional burden on a main central processing unit (CPU) of the mobile device. The system may also receive tuning parameters to account for device mass, dampening filters on accelerometer integrations, latency effects, and user responsiveness to motion effects. Thus, the system allows users to continue to use devices under high motion environmental conditions and improves accuracy of the user's interaction with a device.

In some embodiments, the movement compensation system leverages a two-axis accelerometer associated with the mobile device that has a higher refresh rate than the common vibration frequency experienced by the device. The system performs a continuous refresh to detect and compensate for motion as follows. First, the system reads accelerometer information for X and Y movement of a screen. Then, the system integrates the accelerometer data into current screen velocity and screen position information using settings for device mass and dampening filters. Next, the system applies a screen position offset (e.g., translation) from an original state (possibly by applying offset to whole screen pixel shaders or drivers, if available). Alternatively or additionally, the system may use frequency and amplitude of accelerometer information to determine a readable text or user interface size using hysteresis settings. By gradual interpolation of size, the system then adjusts text or other user interlace elements to a usable size. The system may introduce a delay to prevent excessive and frequent changing of text size. Finally, the system may also use screen position offset information to adjust touch input locations based on the detected movement. The system then repeats these steps in a continual process for as long as motion is detected.

FIG. 1 is a block diagram that illustrates components of the movement compensation system, in one embodiment. The system 100 includes a configuration component 110, a motion detection component 120, a motion processing component 130, a translation component 140, a resizing component 150, and an input adjustment component 160. Each of these components is described in further detail herein.

The configuration component 110 receives one or more configuration parameters that affect motion compensation applied by the system. The parameters may include devices information, such as device mass, that help the system predict how the device will be affected by various types of motion. Other parameters may include information describing the user or the user's preferences. For example, the user may want to turn on or off user interface resizing, touch input compensation, interface translation, and so forth. The system 100 may also ask the user to perform a test to determine how quickly the user reacts to motion. For a user that reacts quickly, the configuration component 110 may store information indicating that compensation should be less than for a user that responds more slowly (and thus is more likely to expect to find user interface elements at their pre-motion location).

The motion detection component 120 detects motion that affects a mobile device. The component 120 may include one or more accelerometers, gyroscopes, or other position and motion sensors that inform the system that movement has occurred and potentially magnitude and direction of the detected movement. The motion detection component 120 may provide motion information using Cartesian coordinates or other forms of describing motion so that the system 100 can respond to the motion with appropriate compensation. The motion detection component 120 may also include one or more external sensors, such as sensors associated with a vehicle or a peripheral attached to the mobile device. The device can communicate with such sensors through direct connection (e.g., universal serial bus (USB) cable) or indirect connections (e.g., Bluetooth, Wi-Fi, Infrared, and so on).

The motion processing component 130 processes the detected motion to determine an appropriate motion compensation response. In some cases, the component 130 may enforce a threshold on the level of motion before compensation is applied. Thus, motion processing may include determining a magnitude of the motion, comparing the magnitude to a compensation threshold, and deciding not to take action if the magnitude does not meet the threshold. The threshold may be user configurable through the configuration component 110. If the motion processing component 130 determines that action is needed, then the component 130 may invoke one or more other components to shift the user interface, resize user interface elements, or adjust received input. These responses also may be governed by user configuration.

The translation component 140 translates a user interface of the mobile device by shifting one or more displayed user interface elements in a direction related to the detected motion. Some mobile devices may provide a virtual screen area that is larger than the physical screen, so that translation can be performed by making some parts of the virtual screen visible on the physical screen. In some embodiments, the user interface of the mobile device is provided as a graphical surface that can be manipulated by the GPU of the device to move the user interface. The component 140 may be able to leverage pixel shaders or other GPU features to avoid adding burden on the CPU of the mobile device. The motion processing component 130 may determine whether to move the screen image with the device or to move in the opposite direction of the motion to create the effect of the user interface remaining in a fixed position while the device moves.

The resizing component 150 resizes one or more user interface elements in response to the detected motion. Resizing may include increasing a font size, making buttons larger, displaying a larger toolbar, or other user interface adjustments that make it easier for a user interacting with the device to do so when the device is potentially bouncing around due to external motion. The system 100 may base the response on the type of activity the user is performing or the particular application that is running. For some types of activities, such as reading, the system 100 may increase the font size and take no other action. For other activities, such as playing a fast-paced game, the system 100 may perform multiple adjustments to compensate for motion, such as making buttons larger, shifting the displayed image in accordance with detected motion, and shifting user input based on the device's movement.

The input adjustment component 160 adjusts received input in response to detected motion. Input for touch screens is based on where the user or a stylus touches the screen. If a user is aiming to hit a particular button and the device moves just at that moment, the user's finger may land at a new location that is not over the displayed button. However, because the system 100 is aware of the movement, the input adjustment component 160 can shift the user's input so that applications running on the device receive the input as if the input were still over the displayed button. Thus, the component 160 may apply one or more translation functions to correct the coordinates of received input to a location where the component 160 determines the input would have been but for the detected motion.

The computing device on which the movement compensation system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
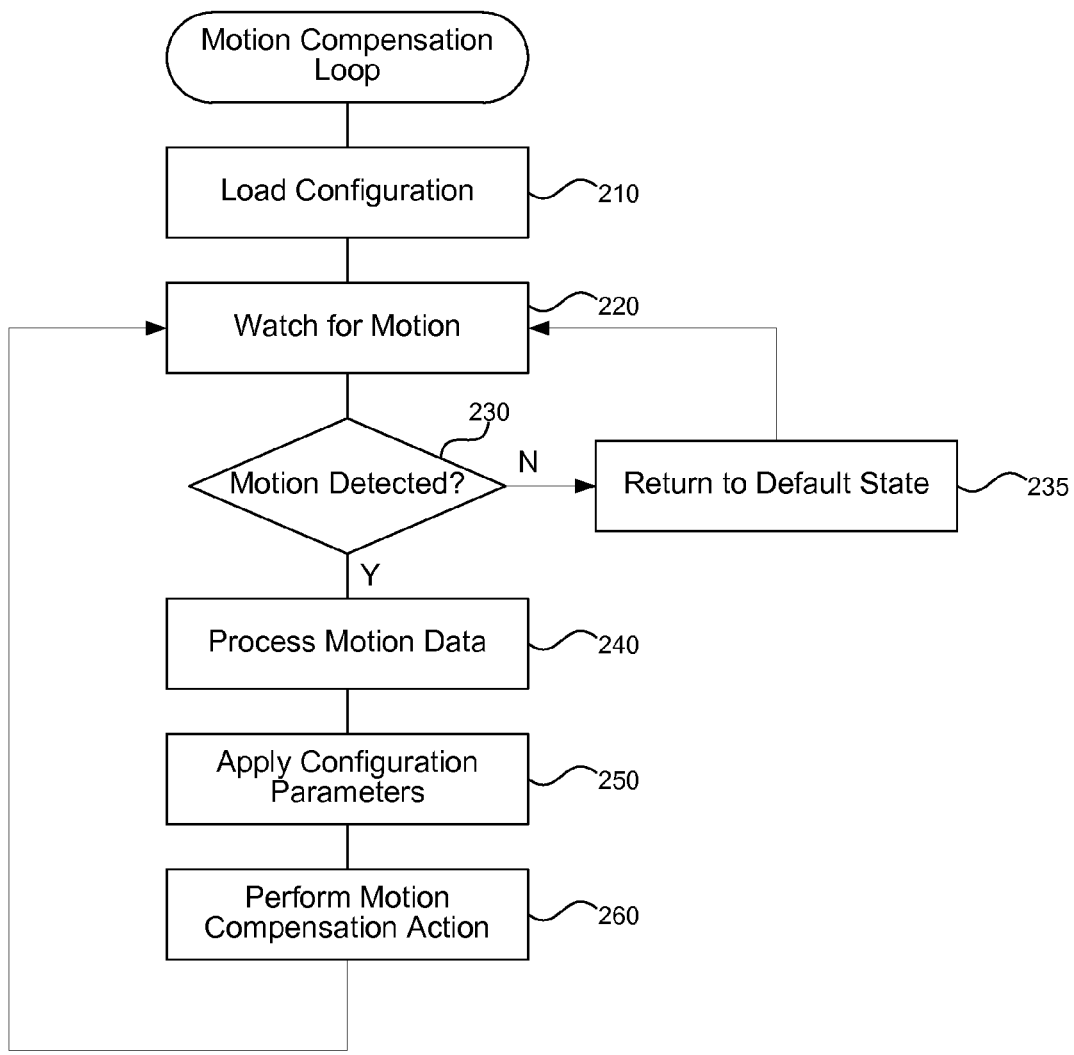
FIG. 2 is a flow diagram that illustrates processing of the movement compensation system to compensate for detected motion that affects use of a mobile computing device, in one embodiment.

FIG. 2 is a flow diagram that illustrates processing of the movement compensation system to compensate for detected motion that affects use of a mobile computing device, in one embodiment.

Beginning in block 210, the system loads configuration information that provides one or more parameters for determining how to compensate for detected motion of the mobile computing device. The parameters may include device characteristics, such as the device's mass or dampening settings. The parameters may also include user characteristics, such as how quickly the user reacts to movement, user preferences such as text size during motion, and so forth. The configuration parameters may also include a motion threshold below which the system will not perform motion compensation. The system loads configuration information from a configuration data store associated with the device or user, such as flash memory or a hard drive associated with the device.

Continuing in block 220, the system watches for motion by reading motion information from one or more motion sensors associated with the mobile computing device. The sensors may include one or more accelerometers, gyroscopes, GPS receivers, or other sensors that provide motion information. The system may regulate how motion is detected to satisfy other requirements, such as increasing battery life by reducing power consumption. In some cases, the system may include a shock sensor that detects sufficient motion to wake up other sensors that can detect more minute movements.

Continuing in decision block 230, if the system detects motion of the mobile computing device, then the system continues at block 240, else the system continues at block 235. The system may detect motion by receiving a software event provided by motion-detecting hardware to an operating system running on the mobile computing device. The system may be implemented within the operating system or as a separate application or service running on the mobile computing device.

Continuing in block 235, after the motion is complete, the system returns to a default "rest" state. In some embodiments, the system may wait for a certain time during which no motion has been detected before returning to the default state. Returning to the default state may include reversing any of the actions taking to compensate for detected motion, such as returning fonts to their normal size, translating screen images and/or user interface elements to their normal location, and so forth. Configuration parameters may affect how and when the system restores to the default state. In some implementations, the system may combine handling of motion and returning to the rest state in the same loop to reduce code paths or for more efficient processing. However, the paths are shown separately here for ease of explanation.

Continuing in block 240, the system processes motion data from the one or more motion sensors that detected motion. The sensors may provide information such as coordinates or distances by which the mobile device moved, a magnitude of the movement, a direction of the movement, and so forth. The information may include coordinates related to the ground such that the system needs to pre-translate the coordinates to relate them to the screen orientation, or the sensors may directly provide screen-relative coordinates.

Continuing in block 250, the system applies the loaded configuration parameters to determine a type of motion compensation to apply in response to the detected motion. The configuration parameters may help the system determine a magnitude of compensation response, such as a dampening factor to apply to detected motion. The configuration parameters may also specify a motion response threshold as well as a type of motion compensation preferred by the user (e.g., screen translation or font resizing). This may also include low pass filtering.

Continuing in block 260, the system performs a motion compensation action that modifies displayed information or received input in response to the detected motion. The modification may include translating the screen image in the x or y direction, resizing fonts or other user interface elements, translating a position of incoming touch input, altering text margin distance, or other motion compensating responses. The system may provide an extensibility layer through which third parties can add new compensation methods. For example, new devices or newly discovered ways of compensation for motion may suggest new ways to compensate for motion detected by the system and provided to external modules. After block 260, the system loops to block 220 to continue watching for motion that affects the mobile device.

Figure 3:
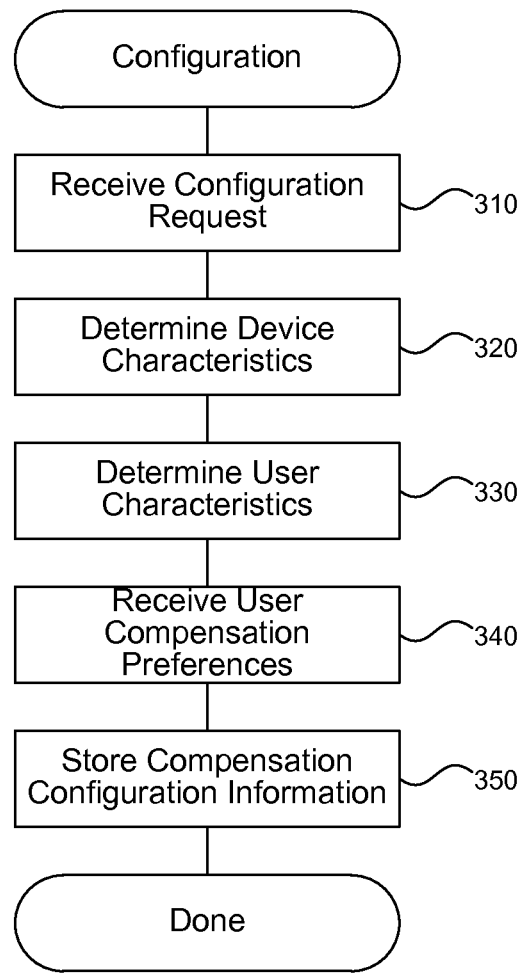
FIG. 3 is a flow diagram that illustrates processing of the movement compensation system to receive configuration information for handling motion that affects use of a mobile computing device, in one embodiment.

FIG. 3 is a flow diagram that illustrates processing of the movement compensation system to receive configuration information for handling motion that affects use of a mobile computing device, in one embodiment.

Beginning in block 310, the system receives a request to configure handling motion detected by the mobile computing device. For example, a user may invoke a settings application provided by the system or associated with the mobile device. An application implementing the system may also include a training phase or other initialization that runs the first time the user opens the application. The training phase may prompt the user to provide configuration information or perform one or more calibration tasks to help the system compensate correctly for detected motion.

Continuing in block 320, the system determines one or more characteristics of the mobile computing device related to compensating for detected motion. The system may detect one or more motion sensors, determine device information such as the device's mass, and so on. The system may receive information by invoking one or more application-programming interfaces (API) provided by an operating system of the mobile computing device for accessing device characteristics.

Continuing in block 330, the system determines one or more user characteristics related to compensating for detected motion. The user characteristics may include physical traits of the user, such as age, responsiveness to motion, reaction time, and so forth. The system may provide the user with one or more tasks to complete to learn information about the user that the system can use upon detecting motion to better compensate for the detected motion. For example, the system may ask the user to attempt to hit a target while the device is moving, so the system can determine where the user's brain thinks the target is. The user may tap a location offset from the actual target that indicates a difference in the user's perception of the target location and the actual location of the device based on the movement. The calibration may ask the user to hit a series of targets while riding as a passenger in a vehicle or in some other typical vibration scenario. The calibration might be able to be run several times to gather more data to progressively make the system more accurate.

Continuing in block 340, the system receives user compensation preferences that determine how the user requests the system to respond to detected motion. The user preferences may specify whether the system applies particular motion compensating techniques, a threshold level of motion before the system applies motion compensation, how large to enlarge fonts or other user interface elements, and so on. The user preferences may allow the user to turn on or off particular motion compensation techniques as well as configuring how particular techniques are applied by the system. The user may set limits on how quickly or often user interface elements such as font size or other element size may change.

Continuing in block 350, the system stores the received device characteristics, user characteristics, and user compensation preferences in a data store for subsequent retrieval upon detection of motion affecting the mobile computing device. The system may store information in a data store provided by the device or associated with the user. The user and/or system may perform configuration through the above steps periodically to improve the motion compensation actions of the system or to modify the behavior of the system in other ways as determined by the user after using the system. In some embodiments, the system may learn over time based on the user's interaction with the system, so that the system can provide motion compensation that is more helpful to the user. After block 350, these steps conclude.

Figure 4:
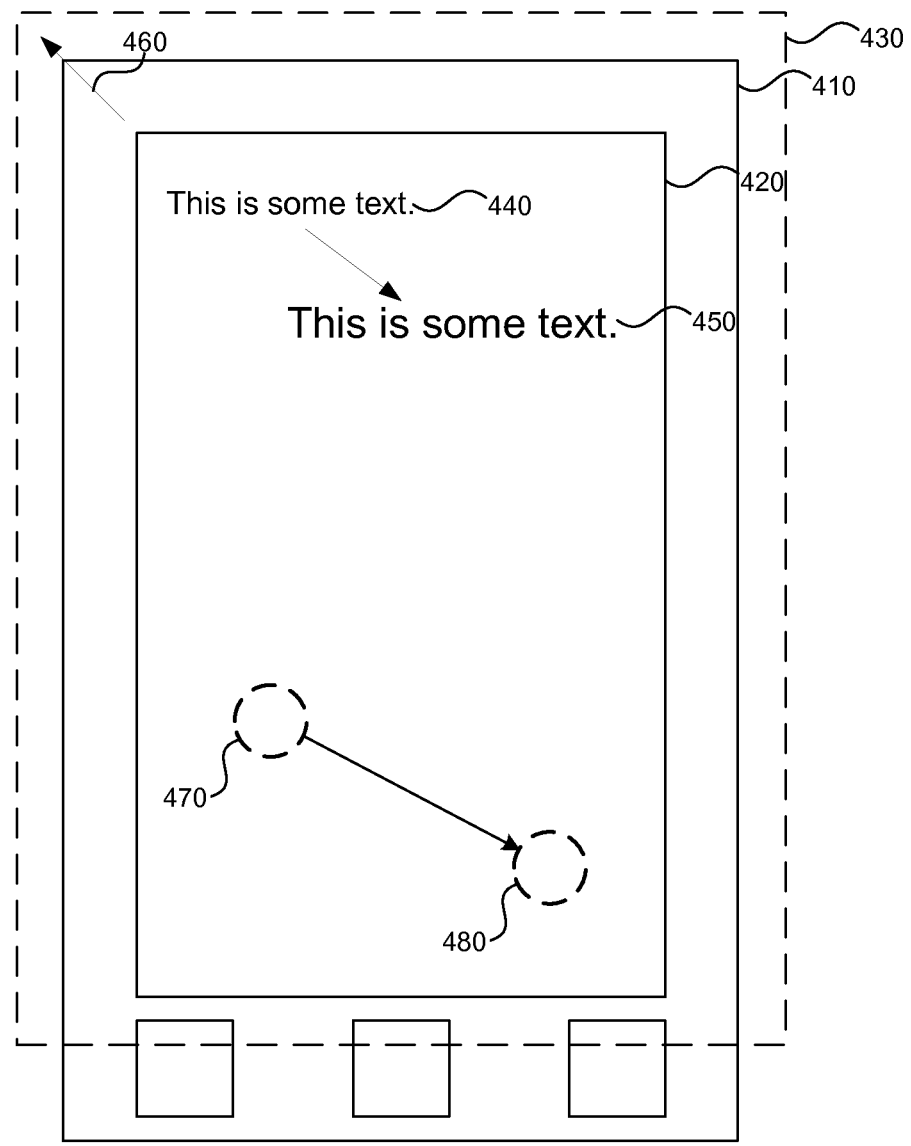
FIG. 4 is a diagram that illustrates a mobile computing device running the movement compensation system, in one embodiment.

FIG. 4 is a diagram that illustrates a mobile computing device running the movement compensation system, in one embodiment. The mobile computing device 410 includes a touchscreen 420. The touchscreen 420 displays one or more elements, such as text 440, and may receive input, such as the touch 470 indicated by the dashed circle. Upon detecting motion, the system can apply a variety of motion compensation techniques described further herein. For example, the display may include a virtual area 430 populated by software that is larger than the touchscreen 420, so that upon detecting device movement the system can translate the displayed image by moving the virtual area 430 in relation to the touchscreen 420. This may allow at least part of the displayed image to appear to the user to remain in the same place even though the mobile computing device 410 is moving. Alternatively or additionally, the system may translate and or enlarge the text 440 to produce the larger text 450. The larger text 450 may be easier for the user to read while the device is moving around. Alternatively or additionally, the system may translate coordinates of detected touch input, such as moving the apparent location of the touch 470 to the location of touch 480 as far as it is perceived by software that receives the touch input. This may allow the software to detect a button press or other action intended by the user, even when the user's actual location of input differs from the displayed user interface elements due to motion affecting the device.

In some embodiments, the movement compensation system increases the size of hit zones associated with user interface elements in response to detecting motions. For many touch interfaces, software provides a hit zone around each user interface element within which the software will accept input related to the element. Thus, a button or other element may have a hit zone closely aligned with the element's borders under normal conditions. Upon detecting motion, the system can expand the hit zone so that touch input at a slightly farther range than the usual element borders is accepted as input associated with the element. This may allow the user to hit a button, slide a switch, or perform other interaction with a touch interface even when the mobile device is moving around.

In some embodiments, the movement compensation system applies a dampening factor to detected motion to select suitable motion compensation. For example, the system may apply a factor of 50% to the detected motion and only slightly compensate for the motion. This is because the user's brain may also be compensating for the motion and it may be less disconcerting for the user to see the display move a little bit than just as much as the motion. The system may allow the user or automated software to tune the factor by which motion is adjusted to determine a good level.

In some embodiments, the movement compensation system accesses motion information from a high-resolution accelerometer associated with the mobile computing device. The human eye has a resolution of about 50 Hz, while many accelerometers can provide motion data at 100 Hz. This higher resolution is helpful for motion compensation, because the system can react in many cases before the user's own eyes have detected a change.

In some embodiments, the movement compensation system works without any changes to software applications typically found on a mobile computing device. The system may operate within an operating system or at the driver or service level to provide motion compensation without the knowledge or input of other software applications running on the device. The applications may simply work better in environments with movement due to the actions of the system to compensate.

From the foregoing, it will be appreciated that specific embodiments of the movement compensation system have been described herein for purposes of illustration, but that various modifications may be made without deviating from the spirit and scope of the invention. Accordingly, the invention is not limited except as by the appended claims.

I claim:

1. A computer-implemented method that compensates for detected motion that affects use of a mobile computing device, the method comprising:

loading configuration parameters for determining how to compensate for detected motion of the mobile computing device, including loading a dampening factor configured to reduce motion compensation based on an amount that a user compensates for motion;

watching for motion of the mobile computing device by reading motion data from one or more motion sensors associated with the mobile computing device;

upon detecting motion of the mobile computing device, processing the motion data from the one or more motion sensors that detected motion by applying the loaded configuration parameters to determine a type of motion compensation to apply in response to the detected motion, wherein applying the loaded configuration parameters comprises applying the dampening factor to the detected motion to reduce an amount of compensation of the detected motion based on an amount that the user compensates for motion;

performing a motion compensation action that modifies displayed information or received input in response to the detected motion, wherein the motion compensation is based on the loaded configuration parameters, including the dampening factor; and wherein the preceding steps are performed by one or more processors.

2. The method of claim 1 wherein loading configuration parameters comprises accessing parameters that include device characteristics that affect motion compensation.

3. The method of claim 1 wherein loading configuration parameters comprises accessing parameters that include user preferences related to motion compensation.

4. The method of claim 1 wherein watching for motion comprises accessing information from sensors selected from the group consisting of an accelerometer, a gyroscope, a GPS receiver, and a shock sensor.

5. The method of claim 1 wherein watching for motion comprises accessing information from a sensor external to the mobile computing device located proximate the mobile computing device.

6. The method of claim 1 wherein detecting motion of the mobile computing device comprises receiving a software event provided by motion-detecting hardware to an operating system running on the mobile computing device.

7. The method of claim 1 wherein processing the motion data comprises receiving coordinates that specify direction and distance of detected motion.

8. The method of claim 1 wherein processing the motion data comprises pre-translating received coordinates to relate the coordinates to a screen orientation.

9. The method of claim 1 wherein applying configuration parameters comprises determining a magnitude of compensation response to apply to detected motion of the mobile computing device.

10. The method of claim 1 wherein applying configuration parameters comprises determining whether the detected motion of the mobile computing device satisfies a configured motion threshold for applying motion compensation.

11. The method of claim 1 wherein performing a motion compensation action comprises translating a screen image to a new location relative to the device screen based on the detected motion.

12. The method of claim 1 wherein performing a motion compensation action comprises resizing fonts, text margins, or other user interface elements to make the elements easier for the user to see during the detected motion.

13. The method of claim 1 wherein performing a motion compensation action comprises translating a position of incoming touch input.

14. A computer system for motion effect reduction for displays and touch input on a mobile computing device, the system comprising:

a processor and memory configured to execute software instructions embodied within the following components:

a configuration component configured to receive one or more configuration parameters that affect motion compensation applied by the system, wherein the configuration component is configured to receive a dampening factor configured to reduce motion compensation based on an amount that a user compensates for motion;

a motion detection component configured to detect motion that affects the mobile computing device;

a motion processing component configured to process the detected motion to determine an appropriate motion compensation response;

a translation component configured to translate a user interface of the mobile computing device by shifting one or more displayed user interface elements in a direction related to the detected motion;

a resizing component configured to resize one or more user interface elements in response to the detected motion; and an input adjustment component configured to adjust received input in response to detected motion to correct coordinates of received input to a location where the component determines the input would have been but for the detected motion.

15. The system of claim 14 wherein the motion detection component comprises one or more accelerometers, gyroscopes, or other position or motion sensors that are configured to inform the system that the detected motion has occurred and a magnitude and direction of the detected motion.

16. The system of claim 14 wherein the motion processing component is configured to enforce a threshold on the level of motion before compensation is applied.

17. The system of claim 14 wherein the translation component is configured to provide a virtual screen area that is larger than a physical screen of the mobile computing device, so that translation can be performed by making some parts of the virtual screen visible on the physical screen using graphical hardware of the mobile computing device to reduce burden on the processor.

18. The system of claim 14 wherein the resizing component is configured to increase a font size to make text displayed on the mobile computing device more readable during the detected motion.

19. The method of claim 1, wherein loading configuration parameters for determining how to compensate for detected motion of the mobile computing device comprises loading user characteristic information comprising one or more physical traits of a user of the mobile computing device such that the one or more physical traits can be used to compensate for detected motion of the mobile computing device, wherein the physical traits comprise at least one of the user's age, responsiveness of the user to motion, or a reaction time of the user.

20. The method of claim 19 further comprising:

asking the user to attempt to hit a target displayed to the user on the mobile computing device, while the mobile computing device is moving;

receiving input from the user attempting to hit the target, while the mobile computing device is moving;

using the input from the user, determining the user's perception of the location of the target;

determining the loaded configuration parameters based on the user's perception of the location of the target.

\* \* \* \* \*